(12) United States Patent
Borg et al.

(10) Patent No.: US 6,289,364 B1
(45) Date of Patent: *Sep. 11, 2001

(54) TRANSPARENCY PROCESSING IN A PAGE DESCRIPTION LANGUAGE

(75) Inventors: Lars U. Borg, Saratoga, CA (US); Stephen E. Carlsen, Issaquah, WA (US); Stephen N. Schiller, Hayward; Mark Hamburg, Scotts Valley, both of CA (US)

(73) Assignee: Adobe Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,611

(22) Filed: Dec. 22, 1997

(51) Int. Cl.[7] .............................. G06F 15/00; G06T 11/60
(52) U.S. Cl. .............................. 707/526; 345/435
(58) Field of Search ........................... 707/500, 517–527; 345/507, 24; 358/434, 538, 515; 375/116; 382/162–165, 276, 232, 305; 34/24, 507

(56) References Cited

U.S. PATENT DOCUMENTS

| 5,528,261 | * | 6/1996  | Holt et al. .......................... 345/150 |
| 5,600,768 |   | 2/1997  | Andresen et al. . |
| 5,636,337 |   | 6/1997  | Boenke et al. . |
| 5,724,494 | * | 3/1998  | Politis .............................. 345/434 |
| 5,745,121 | * | 4/1998  | Politis .............................. 345/433 |
| 5,926,185 |   | 7/1999  | Vyncke et al. . |
| 5,999,664 | * | 12/1999 | Mahoney et al. .................. 382/305 |
| 6,141,462 | * | 10/2000 | Yoshino et al. .................... 382/284 |

FOREIGN PATENT DOCUMENTS

| 23362 95 A | 2/1996  | (AU) . |
| 0 473 340 A | 3/1992  | (EP) . |
| 0 741 485 A | 11/1996 | (EP) . |

* cited by examiner

*Primary Examiner*—Hosain T. Alam
*Assistant Examiner*—Alford W. Kindred
(74) *Attorney, Agent, or Firm*—Fish & Richardson P.C.

(57) ABSTRACT

A raster image processor receives a file of instructions and images in any convenient page description language and blends the images in accordance with the specified blending mode and, possibly, opacity information.

14 Claims, 11 Drawing Sheets

FIG. 3

POSTSCRIPT BLEND IMAGE DATA STRUCTURE
300

| KEY | TYPE | SEMANTICS |
|---|---|---|
| ImageType | INTEGER | (REQUIRED) ALWAYS 1. |
| Blend | BLEND DATA STRUCTURE | (OPTIONAL) SPECIFIES THE BLEND CONTROLS. ON DEFAULT, THE IMAGE IS OPAQUE. |

305

OTHER KEYS AS DEFINED FOR POSTSCRIPT IMAGETYPE 1. SEE THE POSTSCRIPT LANGUAGE REFERENCE MANUAL.

FIG. 4

POSTSCRIPT BLEND DATA STRUCTURE
400

| KEY | TYPE | SEMANTICS |
|---|---|---|
| BlendType | INTEGER | (REQUIRED) ALWAYS 1. |
| BlendMode | NAME | (OPTIONAL) SPECIFIES THE BLEND MODE. DEFAULT IS NORMAL. |
| ConstantOpacity | NUMBER | (OPTIONAL) SPECIFIES THE OBJECT USE A POSITION-INDEPENDENT OPACITY. VALID RANGE IS 0 TO 1. A 0 VALUE INDICATES THE OBJECT IS FULLY TRANSPARENT. A 1 VALUE (DEFAULT) INDICATES THE OBJECT IS OPAQUE. |
| PositionOpacity | VARIOUS | (OPTIONAL) SPECIFIES THE OBJECT USE A POSITION-DEPENDENT OPACITY. DEFAULT VALUE IS 1 (OPAQUE) FOR ALL POSITIONS WITHIN AN OBJECT. |

BLEND MODES
500

| MODE | BLEND FUNCTION |
|---|---|
| NORMAL | $C = B + OPACITY \times (F - B)$ |
| SHADOW | $C = B + OPACITY \times (B - K) \times (F - W)/(W - K)$ |
| GLOW | $C = B + OPACITY \times (B - W) \times (F - K)/(K - W)$ |
| DARKER | $C = B + OPACITY \times (DARKER(F, B) - B)$ |
| LIGHTER | $C = B + OPACITY \times (LIGHTER(F, B) - B)$ |
| ADD | $C = B + OPACITY \times (F - K)$ |
| OVERPRINT | $C = B + OPACITY \times (F - W)$ |

FIG. 6

| MODE | RGB COLOR SPACE | CMYK COLOR SPACE |
|---|---|---|
| NORMAL | C = B + OPACITY x (F - B) | C = B + OPACITY x (F - B) |
| SHADOW | C = B + OPACITY x B x (F - 1) | C = B + OPACITY x F x (1 - B) |
| GLOW | C = B + OPACITY x F x (1 - B) | C = B + OPACITY x B x (F - 1) |
| DARKER | C = B + OPACITY x (MIN(F, B) - B) | C = B + OPACITY x (MAX(F, B) - B) |
| LIGHTER | C = B + OPACITY x (MAX(F, B) - B) | C = B + OPACITY x (MIN(F, B) - B) |
| ADD | C = B + OPACITY x F | C = B + OPACITY x (F - 1) |
| OVERPRINT | C = B + OPACITY x (F - 1) | C = B + OPACITY x F |

FIG. 7

POSTSCRIPT OPACITY IMAGE DATA STRUCTURE
← 700

| KEY | TYPE | SEMANTICS |
|---|---|---|
| ImageType | INTEGER | (REQUIRED) ALWAYS 1. THE PRESENCE OF THIS KEY IDENTIFIES A STRUCTURE AS AN IMAGE. |
| InterleaveType | INTEGER | (OPTIONAL) SPECIFIES THE INTERLEAVING MODE OF THE OPACITY IMAGE DATA AND THE FOREGROUND IMAGE DATA. VALID VALUES ARE 1, 2, AND 3 (DEFAULT). |

InterleaveType

| key | 1 | 2 | 3 |
|---|---|---|---|
| BitsPerComponent | SAME VALUE AS IN FOREGROUND IMAGE. | ANY VALUE. | ANY VALUE. |
| DataSource | NOT ALLOWED. | NOT ALLOWED. | ANY SOURCE. |
| Height | SAME VALUE AS IN FOREGROUND IMAGE. | MULTIPLE OR SUB-MULTIPLE OF FOREGROUND IMAGE. | ANY VALUE. |
| ImageMatrix | SAME VALUE AS IN FOREGROUND IMAGE. | SAME ORIENTATION AS FOREGROUND IMAGE. | SAME ORIENTATION AS FOREGROUND IMAGE. |
| Width | SAME VALUE AS IN FOREGROUND IMAGE. | ANY VALUE. | ANY VALUE. |
| MultipleDataSource | FALSE. | FALSE. | ANY VALUE. |

FIG. 9

PDF BLEND IMAGE DATA STRUCTURE
900

| KEY | TYPE | NAME | SEMANTICS |
|---|---|---|---|
| Type | | BLEND DATA STRUCTURE | (REQUIRED) ALWAYS XOBJECT. |
| Blend | | | (OPTIONAL) SPECIFIES THE BLEND CONTROLS. IF THE VALUE OF THE XOBJECT'S IMAGEMASK KEY IS TRUE OR IF THE MASK KEY IS PROVIDED, THE BLEND KEY IS NOT PERMITTED. |

905

OTHER KEYS AS DEFINED FOR A PDF XOBJECT. SEE THE PDF LANGUAGE REFERENCE MANUAL.

FIG. 10

PDF OPACITY IMAGE DATA STRUCTURE
↙ 1000

| KEY | TYPE | SEMANTICS |
|---|---|---|
| BitsPerComponent | INTEGER | (REQUIRED) VALID VALUES ARE 1, 2, 4, 8, AND 16. |
| ColorSpace | NAME | (REQUIRED) ALWAYS /DEVICEGRAY |

OTHER KEYS AS DEFINED FOR A PDF IMAGE. SEE THE PDF LANGUAGE REFERENCE MANUAL.

TRANSPARENCY PROCESSING IN A PAGE DESCRIPTION LANGUAGE

BACKGROUND

The present invention relates generally to processing and displaying digital documents and, more particularly, to processing images in a raster image processor using transparency information.

Digitally stored documents are often represented in an output-device independent language known as a page description language (PDL). Well known PDLs include the POSTSCRIPT language and the PORTABLE DOCUMENT FORMAT (PDF) language. Both POSTSCRIPT and PORTABLE DOCUMENT FORMAT are trademarks of Adobe Systems Incorporated, San Jose, Calif. In a PDL representation, a document may be described in terms of a list of instructions and resources. Instructions, for example, include commands to draw a line between two points or to fill a region with a specified color. Resources, for example, include images (raster representations of displayable objects), color spaces, and font specifications.

The transparency of a graphical object indicates the extent to which an underlying object may be seen through it. Here, the term object is used to denote any graphical entity such as an image, a font, or any other printable feature. In graphical processing, an object's transparency is implemented through a technique known as blending. Blending involves combining a foreground color, associated with a foreground graphical object, and a background color, associated with a background graphical object, to create a third color. Blending can give an object the appearance of being translucent.

In conventional graphical processing systems, blending generally is implemented in a special purpose application program executing on a general purpose computer. In this environment, blending operations interrupt the execution of the application program and consume the computer processor's time and memory resources. In addition, these special purpose applications are not typically capable of optimizing their output to a specific output device.

SUMMARY

Generally, the invention provides page description language extensions that allow blending operations to be performed within a raster image processor. These extensions include, but are not limited to, specification of a desired blending operation (e.g., normal, shadow, glow, darker, lighter, add, and overprint), a constant opacity parameter, and a position opacity parameter associated with an opacity data structure.

Advantages of the invention include, but are not limited to, one or more of the following: conserves local computer resources by performing graphic object blending operations as part of the raster image processing process; graphical objects can remain device independent (e.g., with respect to resolution and color space) until final output is generated; and raster image processor blending allows users to obtain blended graphical output without modifying their graphical processing work flow.

BRIEF DESCRIPTION OF THE DRAWINGS

FIG. 3 shows a POSTSCRIPT blend image data structure.

FIG. 4 shows a POSTSCRIPT blend data structure.

FIG. 5 shows some general blend functions.

FIG. 6 illustrates blend functions for the RGB and CMYK color spaces.

FIG. 7 shows a POSTSCRIPT opacity image data structure.

FIG. 8 illustrates some of the interdependencies between an opacity image's InterLeave key and the image's associated blend image.

FIG. 9 shows a PORTABLE DOCUMENT FORMAT blend image data structure.

FIG. 10 shows a PORTABLE DOCUMENT FORMAT blend data structure.

DETAILED DESCRIPTION

The following contemporaneously filed and commonly owned patent applications are incorporated by reference: "Dehalftoning of Digital Images" by Stephen Carlsen et al., attorney docket no. 07844/087001; "Blending Graphics Objects In A Frame Buffer" by Stephen Carlsen, attorney docket no. 07844/229001; "Blending Image Data Using Layers" by Stephen Carlsen et al., attorney docket no. 07844/231001; "Blending with Planar Maps" by Stephen N. Schiller et al., attorney docket no. 07844/228001; and "Conversion of Alpha-Multiplied Color Data by Lars Borg et al., attorney docket no. 07844/230001.

The invention may be embodied in any output display device that receives page description data and produces from that data output capable of being used to generate visual output, for example on a piece of paper. The invention has particular applicability to raster image processing (RIP) devices used within an graphical processing system and will be described in terms of an embodiment in such a device. RIPs may also be used in laser printers, dot matrix printers, ink-jet printers, plotters, image setters, digital presses, and the like.

Figure 1:
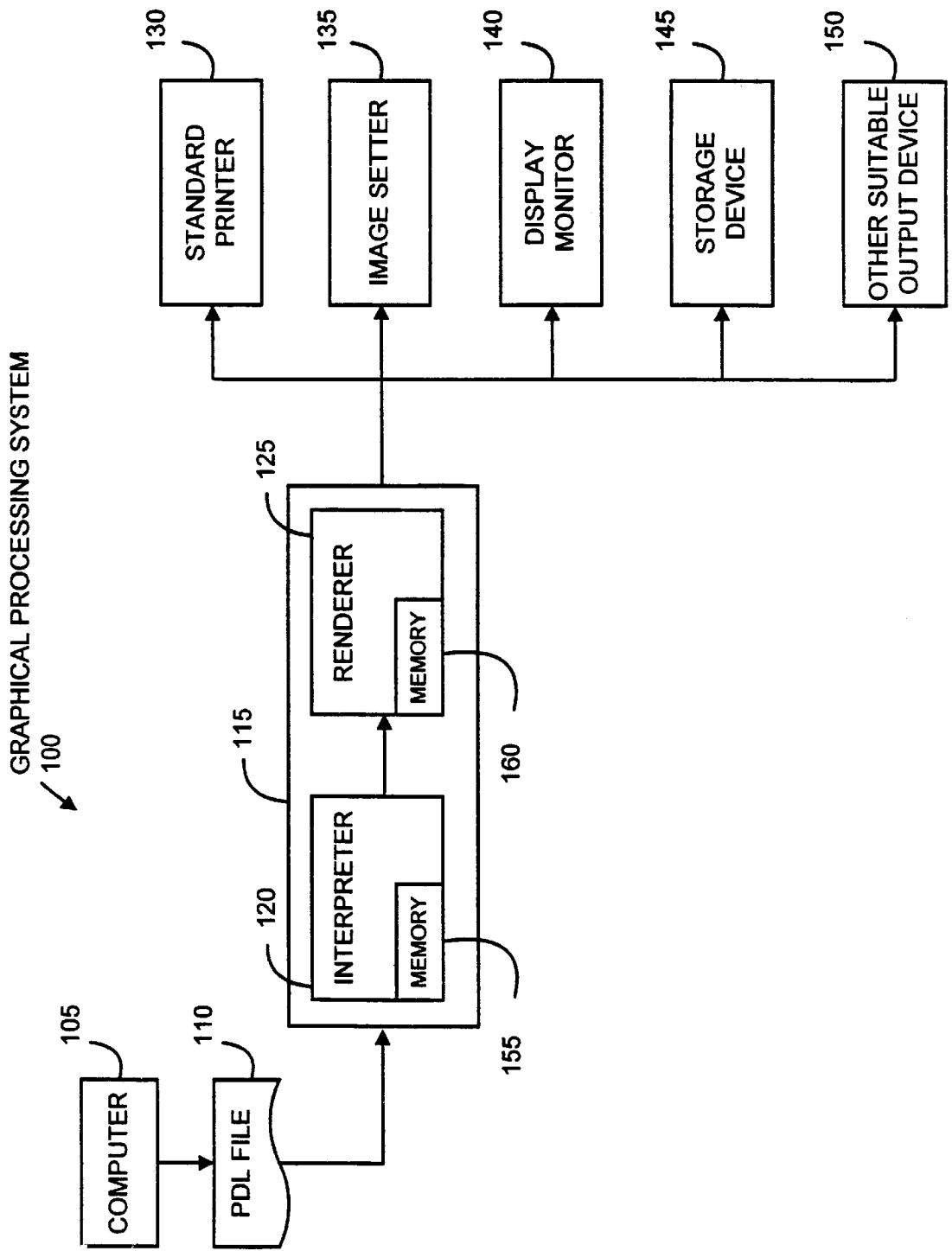
FIG. 1 shows a schematic block diagram of a graphical processing system.

Referring to FIG. 1, an illustrative graphical processing system 100 includes a computer 105 and a raster image processor (RIP) device 115. The computer 105 may be A of any type, including a general purpose computer or a dedicated graphics workstation and usually transmits information to the RIP 115 in the form of a file 110 whose graphical contents are represented in a page description language (PDL). The interpreter 120 executes the PDL file's 110 instructions and conveys the interpreted data to a renderer 125. The renderer 125 generates a raster based representation (e.g., a bit stream) of its input. Renderer output may be sent to a standard (e.g., color or greyscale) printer 130, an image setter 135, a display monitor 140, a =storage device 145, or any other suitable output device 150. Common storage devices 145 include, but are not limited to, magnetic disks (fixed, floppy, and removable), other magnetic material such as tape, and optical medica such as CD-ROM disks. The interpreter 120 and renderer 125 may include memory (155 and 160 respectively) which may be read only memory or random access memory or a combination thereof.

The RIP 115 performs graphic object blending operations. As a result, computer 105 resources (e.g., time and memory) are not consumed by the blending operations, and output from the renderer 125 can easily be optimized for the specific output device. These results are possible because the PDL file 110 sent from the computer 105 to the RIP 115 contains blending information. To accomplish this the chosen PDL must be extended, as described below, to include structures that incorporate blending information, and instructions that operate on this information.

The terms below have the given meanings unless indicated otherwise. Additional definitions and standard nomenclature are given in the POSTSCRIPT Language Reference Manual, second edition published by Addison-Wesley Publishing Company (hereinafter the Reference Manual), the Supplement: PostScript Language Reference Manual, Language Level 3 Specification, version 3010 (hereinafter the Supplement) published by Adobe Systems Incorporated, and the Portable Document Format Reference Manual, version 1.2 available from Adobe Systems Incorporated (hereinafter the PDF Reference Manual).

1. Blend mode: The way in which two or more colors can be combined, see discussion below.
2. Blending color space: The color space in which a foreground color and a background color are combined.
3. Blending: The process of combining a foreground color and a background color to create a third color which can create the appearance of translucency. The resulting color is a function of the foreground color, the background color, the blend mode, and the foreground object's opacity characteristics. This definition of blending explicitly excludes Boolean operations (e.g., exclusive-or) on bit data and is instead, directed at mathematical operations on multibit data.
4. Colorant or color component: Individual colorants (color components) in a painting scheme. For example, the red, green, blue (RGB) color space is comprised of three colorants. The cyan, magenta, yellow, and black (CMYK) color space is comprised of four colorants.
5. Foreground, background, source, destination: The object to be printed is the source or foreground object. The output area which holds previously printed objects, such as a page raster buffer, is the destination or background.
6. Matte color: A constant color towards which foreground colors can fade.
7. Opacity: The degree of an object's opaqueness. A 0 value means the object is fully transparent, and a 1 value means the object is fully opaque. Opacity is also referred to as alpha ($\alpha$). An opaque object always obscures any object already printed at the same location on a page, and thus an opaque object always appears to be in front of (overlie) previously printed objects.
8. Opaque: The opposite of transparent. The color of a fully opaque foreground object is not blended with the background. The resulting color when an opaque object is blended with a background is the color of the opaque object.
9. Pre-multiplied alpha images: Images whose individual color values (C) have been previously multiplied by the image's opacity value: $C=M+\alpha(F-M)$; where F is the image's original (foreground) color, M is the image's matte color, and $\alpha$ is the color values' opacity value.

Figure 2:
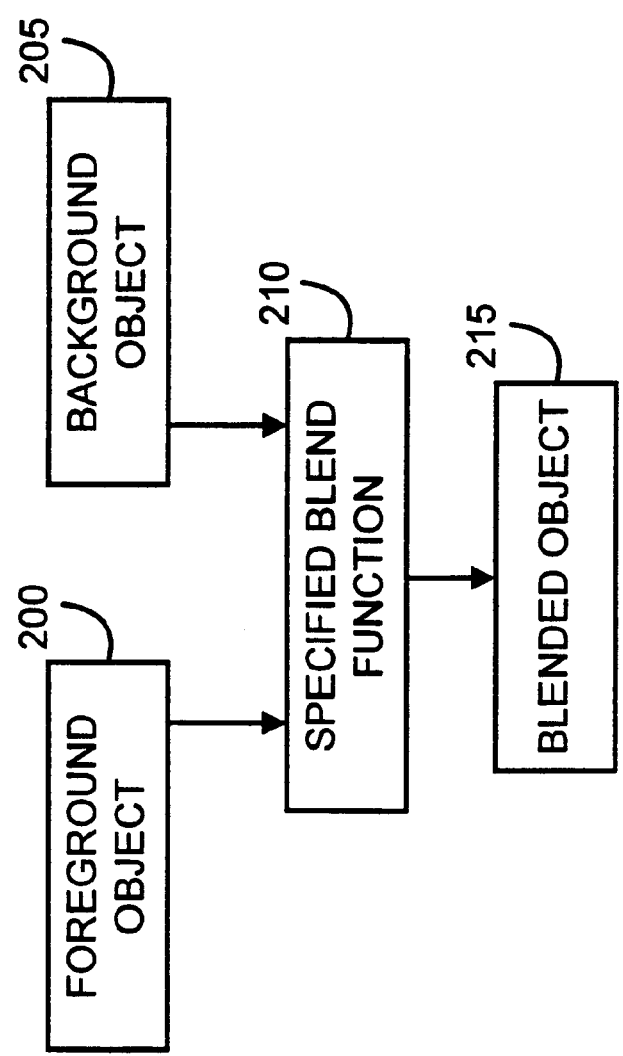
FIG. 2 illustrates blending foreground and background graphical objects.

Referring to FIG. 2, in general the process of blending takes a foreground object 200 having associated blend information, and a background object 205 and combines them in accordance with a specified blend function 210 to generate a blended object 215. The foreground object 200 could, for example, be an image. Similarly, the background object 205 could be an image. The blended object 220 can be considered as a final object (e.g., image), or treated as the foreground or background object in a subsequent blending operation. A new image type, referred to as a "blend image" is described below for the POSTSCRIPT and PDF languages that incorporates the necessary information to permit the rendering of non-opaque (transparent) images.

FIG. 3 shows an illustrative POSTSCRIPT language blend image data structure 300. The blend image data structure 300 extends the conventional POSTSCRIPT image object by including a blend parameter or key 305.

FIG. 4 shows a blend data structure 400 (also referred to as a blend dictionary) as referenced by the blend image's Blend key 305. Blending generally occurs in two stages and is controlled though the BlendMode 405 key of the blend data structure 400. In the first stage, the foreground image and background colors are combined in accordance with a specified blending function. In the second stage, the resulting color is multiplied by the foreground image's opacity.

A general formula for blending is:

$$C=B+opacity \times f(BlendMode, F, B);$$

where C represents the resulting or blended color, B the background color, F the foreground color, and f( ) one of a number of possible blend functions. The specific blend function chosen in any given instance will depend upon the chosen blend mode as identified by the BlendMode parameter 405 in the image's blend data structure 400.

Referring to FIG. 5, an illustrative set of blend functions or modes 500 are defined. The variables C, F, B, W, and K represent values for each color component of the blending color space: C the resulting blended color value; F the foreground color value; B the background color value; W the color value for the color space's lightest color, e.g., white; and K the color value for the color space's darkest color, e.g., black. The function Darker( ) returns the minimum of its input arguments if K is less than W, and the maximum of its input arguments if K is greater than or equal to W. The function Lighter( ) returns the maximum of its input arguments if K is less than W, and the minimum of its input arguments if K is greater than or equal to W. While common values for W and K are 0 and 1, essentially any value is possible. For example, in the XYZ color space W can be 0.95, 1, or 1.09 depending on the component. Values for F and B may be in the range [W . . . K] or [K . . . W]. Each component in the blended color C is clipped to the range [W . . . K] or [K . . . W].

The normal blend mode 505 is a weighted average of the foreground and background colors. The shadow blend mode 510 simulates a shadow by scaling the background color towards dark proportional to the darkness and color of the foreground color. The glow blend mode 515 simulates a glow by scaling the background color towards light proportional to the lightness and color of the foreground color. The darker blend mode 520 selects the darker of the foreground and background colors. The lighter blend mode 525 selects the lighter of the foreground and background colors. The add blend mode 530 simulates two combined light sources by adding color intensities. The overprint blend mode 535 simulates overprinting of two inks by adding ink color values.

Blend functions or modes, such as those shown in FIG. 5, can be defined for any color space where each color component increases monotonically from light to dark or from dark to light. Illustrative blend functions for the RGB and CMYK color spaces are defined in FIG. 6. (In FIG. 6, the Min( ) function returns the minimum of its parameters and the Max( ) function returns the maximum of its parameters.)

As shown in FIG. 4, a blend image's opacity may be derived from two sources—a constant value 410 and a position-dependent value 415. Both opacities are optional and default to a value of 1 (opaque). The effective opacity at any position x, y within the image area is given by the product of these two opacities:

opacity[x, y]=ConstantOpacity×PositionOpacity[x, y].

The position-dependent opacity 415 takes its values from either an image or a pattern. The presence of PatternType or ImageType in a blend data structure's 400 PositionOpacity 415 parameter indicates one of these types of opacity information is present/available.

As shown in FIG. 7, a POSTSCRIPT opacity image data structure 700 is a type of image data structure that has the same size, orientation, and placement in user space as its associated blend image 300.

Opacity image data can be interleaved with its associated blend image (i.e., the foreground image) as specified in the opacity image data structure's 700 InterleaveType 705 parameter. If InterleaveType 705 is 1, interleaving is performed on a per pixel basis from a single data source in the foreground (blend) image. If InterleaveType 705 is 2, interleaving is performed on scanlines from a single data source in the foreground (blend) image. If InterleaveType 705 is 3, no interleave is performed and independent data sources for the opacity image and the foreground image are used. (For additional details on the parameter InterleaveType, see ImageType 3 as described in the Supplement.) FIG. 8 shows the interdependencies between an opacity image's InterleaveType 705 value and the opacity image's associated blend image (i.e., the foreground image). (Image parameters not shown in FIGS. 3 and 4, and cited in FIG. 8 are described in the Reference Manual.)

If PositionOpacity 415 has the value 'PatternType' then the foreground (blend) image's opacity is determined by a pattern (as distinguished from an image) via a pattern dictionary. Pattern dictionaries are defined in the Reference Manual and PDF Reference Manual. As defined in these references, the value of PatternType can be 1 (representing a tiled pattern) or 2 (representing a shading).

For PatternType 1, PaintType has a value of 1 (a colored pattern), and the pattern is tiled to cover the blended image area. Device pixels for which the pattern provides no color are transparent. If color spaces other than DeviceGray are used, the colors are implicitly converted to DeviceGray and the resulting gray color value is used as the opacity value where 0 (black) is transparent and 1 (white) is opaque.

Referring to FIG. 9, a PDF blend image data structure 900 is represented as a modified image XObject. (See the PDF Reference Manual.) As with the POSTSCRIPT language's blend image data structure 300, an XObject blend image 900 contains descriptors for a blend data structure 905 that stores blend control information. Unless otherwise noted, extensions (e.g., blending functions) to the PDF language are the same as those described above for the POSTSCRIPT language.

A PDF blend image's opacity image data structure 1000 is shown in FIG. 10. Unlike the POSTSCRIPT opacity image data structure 700, the PDF opacity image data structure's 1000 data is not interleaved with the PDF blend image 900. Further, the opacity image may not use the PDF defined Blend, ImageMask or Mask keys parameters.

Figure 11:
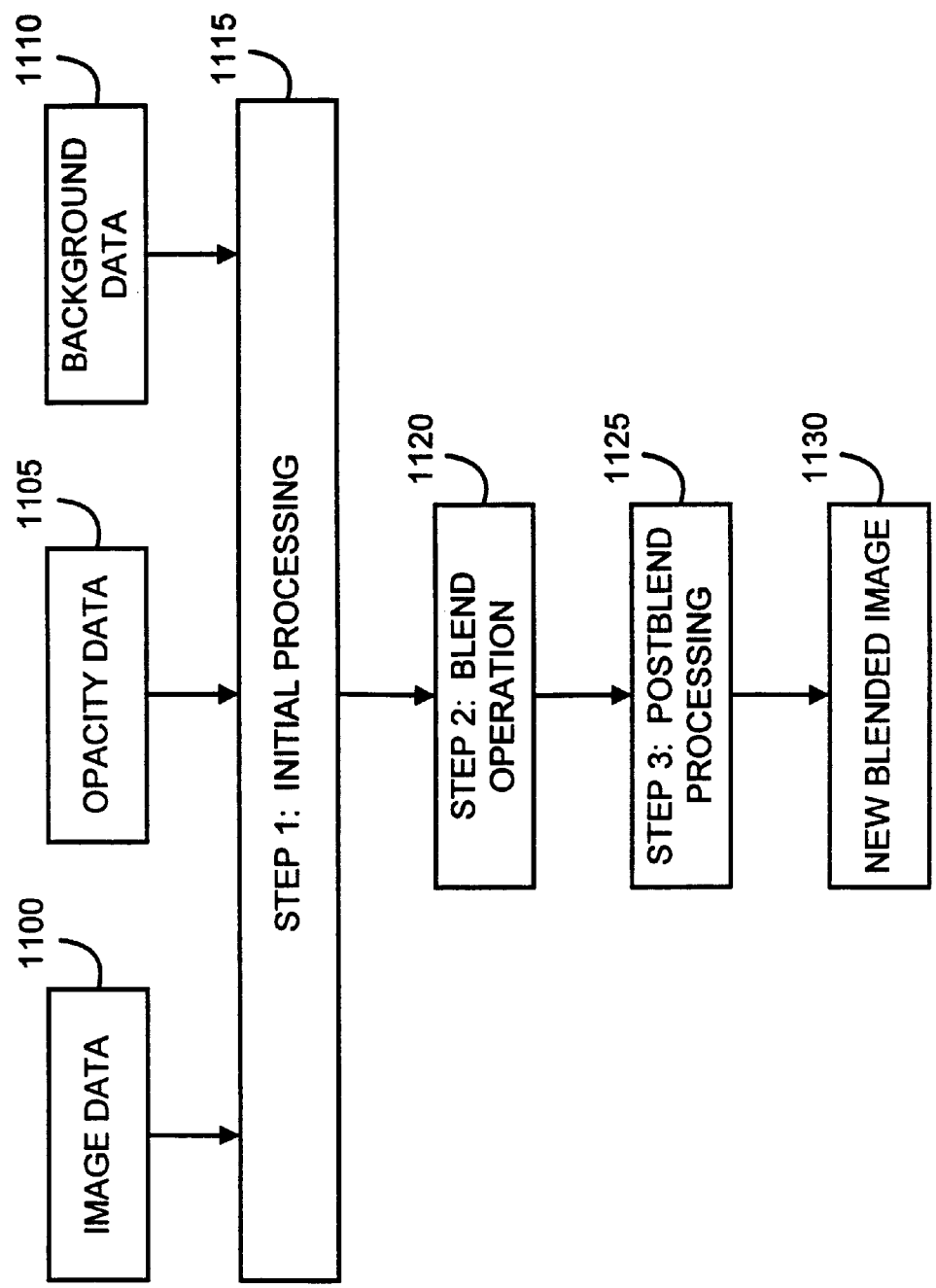
FIG. 11 illustrates blending a foreground object, which includes opacity information, and a background object.

Blending a foreground object which may also have associated opacity information with a background object is illustrated in FIG. 11. In a first step, foreground image data 1100, foreground opacity data 1105, and background data 1110 is subject to initial processing 1115. (As discussed earlier, opacity data 1105 may or may not be present in any given blending operation.) Initial processing typically includes ensuring the image data 1100 and background data 1110 are in a common color space and that all three (image, opacity, and background data) are in a common representation format, e.g., raster format.

During the blend operation in step 2 1120, foreground image and background colors are combined in accordance with the foreground image's specified blend mode (which identifies a specified blending function, see FIGS. 3 through 7, 9 and 10). In practice, a blended color is calculated for each color component of each of the foreground image's color samples independently of the image's other color components.

In step 3 1125 postblend operations such as halftoning are performed. When complete, a new blended image 1130 is ready for output to a specified output device or storage.

The present invention has been described in terms of specific embodiments, which are illustrative of the invention and are not to be construed as limiting. Other embodiments than those described above are within the scope of the following claims. For example, the names of the defined structures' parameters and the order of performing steps of the invention may be changed by those skilled in the art and still achieve the desired results. In addition, blending operations may take place in the RIP's output buffer or in a separate buffer. Further, other steps, common to image processing, such as decoding and interpolating may be implemented without departing from the invention.

The invention may be implemented in digital electronic circuitry or in computer hardware, firmware, software, or in combinations of them. For example, the invention may be implemented, at least in part, as a computer program tangibly embodied in a machine-readable storage device for execution by a computer processor. Method steps according to the invention may be performed by a computer processor executing instructions organized, e.g., into program modules to operate on input data and to generate output. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Any of the foregoing may be supplemented by, or incorporated in, specially-designed application-specific integrated circuits (ASICS). Other embodiments than those described above are within the scope of the following claims.

What is claimed is:

1. A page description language data structure able to be stored in memory and part of a page description language file defining a page description of an image, the data structure being an extension of the page description language object data structure of the page description language and associated with two objects of a page description defined in the page description language, the data structure comprising a blend parameter indicating how to blend an associated object with another object in the page description to produce a blended image.

2. The data structure of claim 1 wherein the blend parameter comprises:
   a blend mode parameter for indicating a specified blend mode;
   a constant opacity parameter; and
   a position-dependent opacity parameter that when combined with the constant opacity parameter describes an opacity for each pixel in blend image, the position-dependent opacity parameter depending on a position of the associated object within the blend image.

3. The data structure of claim 1 wherein the page description language is the POSTSCRIPT language.

4. The data structure of claim 1 wherein the page description language is the PORTABLE DOCUMENT FORMAT language.

5. A program storage device readable by a computer system, the program storage device having encoded therein a program of instructions that includes a page description language file that includes a page description language description of an image file, the page description language file including instructions to define a page description language data structure, the page description language data structure including an object structure and an extension thereof, the extension including a blend parameter describing how to blend an associated object with another object of the page description to produce a blended image, the blend parameter further indicating a constant opacity parameter and a position-dependent opacity parameter that together describe an opacity of the blend image, the position-dependent opacity parameter depending on a position within the blend image.

6. A raster image processor comprising:

an interpreter adapted to receive a page description language file including graphic image data represented in a page description language and having a blend parameter indicating a blend data structure, the blend data structure being an extension of the page description language object data structure of the page description language and comprising blending information for blending two objects to produce a blended image, and generate the blended image based on the blending information; and a renderer adapted to receive the blended image data from the interpreter and generate a raster based representation of the blended image.

7. The raster image processor of claim 6 wherein the blending information comprises a blend parameter indicating how to blend an associated object with one or more other objects in the page description to produce the blended image.

8. The raster image processor of claim 7 wherein the blending information comprises an opacity data structure that describes an opacity of the blend image.

9. The raster image processor of claim 6 further comprising a print device for outputting the blended image.

10. The raster image processor of claim 9 wherein the print device is a color printer.

11. The raster image processor of claim 9 wherein the print device is an image setter.

12. The raster image processor of claim 9 wherein the print device is a storage device.

13. The raster image processor of claim 6 wherein the page description language is the POSTSCRIPT language.

14. The raster image processor of claim 6 wherein the page description language is the PORTABLE DOCUMENT FORMAT language.

\* \* \* \* \*

UNITED STATES PATENT AND TRADEMARK OFFICE
CERTIFICATE OF CORRECTION

PATENT NO.    : 6,289,364 B1
DATED         : September 11, 2001
INVENTOR(S)   : Lars U. Borg Stephen E. Carlsen, Stephen N. Schiller and Mark Hamburg It is certified that error appears in the above-identified patent and that said Letters Patent is hereby corrected as shown below:

<u>Title page,</u>
Item [54], please delete "TRANSPARENCY PROCESSING IN A PAGE DESCRIPTION LANGUAGE" and replace with -- DATA STRUCTURE FOR SUPPORTING BLEND OPERATIONS --
Item [56], References Cited, U.S. PATENT DOCUMENTS, please insert the following two documents:
-- 5,651,107    7/1997      Frank et al. ................. 345/344
5,479,597       12/1995     Fellous ..................... 345/302 --

Signed and Sealed this

Twelfth Day of November, 2002

Attest:

Attesting Officer

JAMES E. ROGAN
*Director of the United States Patent and Trademark Office*